US012705483B2

United States Patent

(12) United States Patent
Keen et al.
(10) Patent No.: US 12,705,483 B2
(45) Date of Patent: Aug. 11, 2026

(54) AI GAN ENABLED MEDIA COMPRESSION FOR OPTIMIZED RESOURCE UTILIZATION

(71) Applicant: INTERNATIONAL BUSINESS MACHINES CORPORATION, Armonk, NY (US)

(72) Inventors: Martin G. Keen, Cary, NC (US); John M. Ganci, Jr., Raleigh, NC (US); Atul Mene, Morrisville, NC (US); Sarbajit K. Rakshit, Kolkata (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 704 days.

(21) Appl. No.: 18/306,687

(22) Filed: Apr. 25, 2023

(65) Prior Publication Data

US 2024/0362473 A1 Oct. 31, 2024

(51) Int. Cl.

| | |
|---|---|
| ***G06N 3/0464*** | (2023.01) |
| ***G06N 3/0475*** | (2023.01) |
| ***G06N 3/08*** | (2023.01) |

(52) U.S. Cl.

CPC ............. *G06N 3/08* (2013.01); *G06N 3/0475* (2023.01); *G06N 3/0464* (2023.01)

(58) Field of Classification Search

CPC ....... G06N 3/0464; G06N 3/08; G06N 3/0475

See application file for complete search history.

(56) References Cited

U.S. PATENT DOCUMENTS

| | | | |
|---|---|---|---|
| 7,397,964 | B2 | 7/2008 | Brunner |
| 8,374,462 | B2 | 2/2013 | Jiang |

(Continued)

FOREIGN PATENT DOCUMENTS

| | | | |
|---|---|---|---|
| CN | 102332162 | A | 1/2012 |
| CN | 112037131 | A | 12/2020 |

(Continued)

OTHER PUBLICATIONS

Brownlee, "A Gentle Introduction to Generative Adversarial Networks (GANs)", Machine Learning Mastery, Jun. 17, 2019, pp. 1-38. https://machinelearningmastery.com/what-are-generative-adversarial-networks-gans/.

(Continued)

*Primary Examiner* — Beau D Spratt

(74) *Attorney, Agent, or Firm* — Robert R. Aragona

(57) ABSTRACT

An embodiment for compressing media utilizing a generative adversarial network (GAN) is provided. The embodiment may include receiving one or more media assets and historical data from a knowledge corpus in accordance with an identified usage context. The embodiment may also include identifying one or more objects in the one or more media assets. The embodiment may further include deriving a relevance score for each identified object. The embodiment may also include creating a training data set. The embodiment may further include applying one or more modifications to each object in a first set. The embodiment may also include in response to determining a GAN discriminator is able to identify each object in the first set modified by the GAN generator as real, generating one or more updated media assets including a second set of one or more objects that are identified by the GAN discriminator as real.

17 Claims, 3 Drawing Sheets

(56) References Cited

U.S. PATENT DOCUMENTS

| | | | | |
|---|---|---|---|---|
| 8,488,883 | B2 | 7/2013 | Gutelzon | |
| 10,540,578 | B2 | 1/2020 | Madani | |
| 10,944,996 | B2 | 3/2021 | Bortman | |
| 11,271,984 | B1 | 3/2022 | Sivaswamy | |
| 2018/0174052 | A1* | 6/2018 | Rippel | G06N 3/084 |
| 2021/0124995 | A1* | 4/2021 | Mas Montserrat | G06F 18/214 |
| 2021/0150354 | A1 | 5/2021 | Karras | |
| 2021/0264568 | A1 | 8/2021 | Shi | |
| 2022/0164602 | A1* | 5/2022 | Frtunikj | G06V 10/774 |
| 2023/0004805 | A1* | 1/2023 | Tawari | G06N 3/045 |
| 2023/0105436 | A1* | 4/2023 | Du | G06N 3/045 375/240.02 |
| 2023/0326088 | A1* | 10/2023 | Bv | H04N 19/91 382/232 |

FOREIGN PATENT DOCUMENTS

| | | | |
|---|---|---|---|
| CN | 112616054 | A | 4/2021 |
| EP | 3796220 | A1 | 3/2021 |

OTHER PUBLICATIONS

IBM, "Mobile App Development Platform", https://www.ibm.com/cloud/mobile, [Accessed on Feb. 22, 2023], 14 pages.

Pathmind, "A.I. Wiki A Beginner's Guide to Important Topics in AI, Machine Learning, and Deep Learning.", https://wiki.pathmind.com/generative-adversarial-network-gan, Accessed on Apr. 25, 2023, 28 pages.

Wikipedia, "Generative adversarial network", https://en.wikipedia.org/wiki/Generative_adversarial_network, Accessed on Apr. 25, 2023, 33 Pages.

* cited by examiner

COMPUTER 101

PROCESSOR SET 110

PROCESSING CIRCUITRY 120

CACHE 121

COMMUNICATION FABRIC 111

VOLATILE MEMORY 112

PERSISTENT STORAGE 113

OPERATING SYSTEM 122

MEDIA COMPRESSION PROGRAM 150

PERIPHERAL DEVICE SET 114

UI DEVICE SET 123

STORAGE 124

IoT SENSOR SET 125

NETWORK MODULE 115

END USER DEVICE 103

WAN 102

REMOTE SERVER 104

REMOTE DATABASE 130

PRIVATE CLOUD 106

GATEWAY 140

PUBLIC CLOUD 105

CLOUD ORCHESTRATION MODULE 141

HOST PHYSICAL MACHINE SET 142

VIRTUAL MACHINE SET 143

CONTAINER SET 144

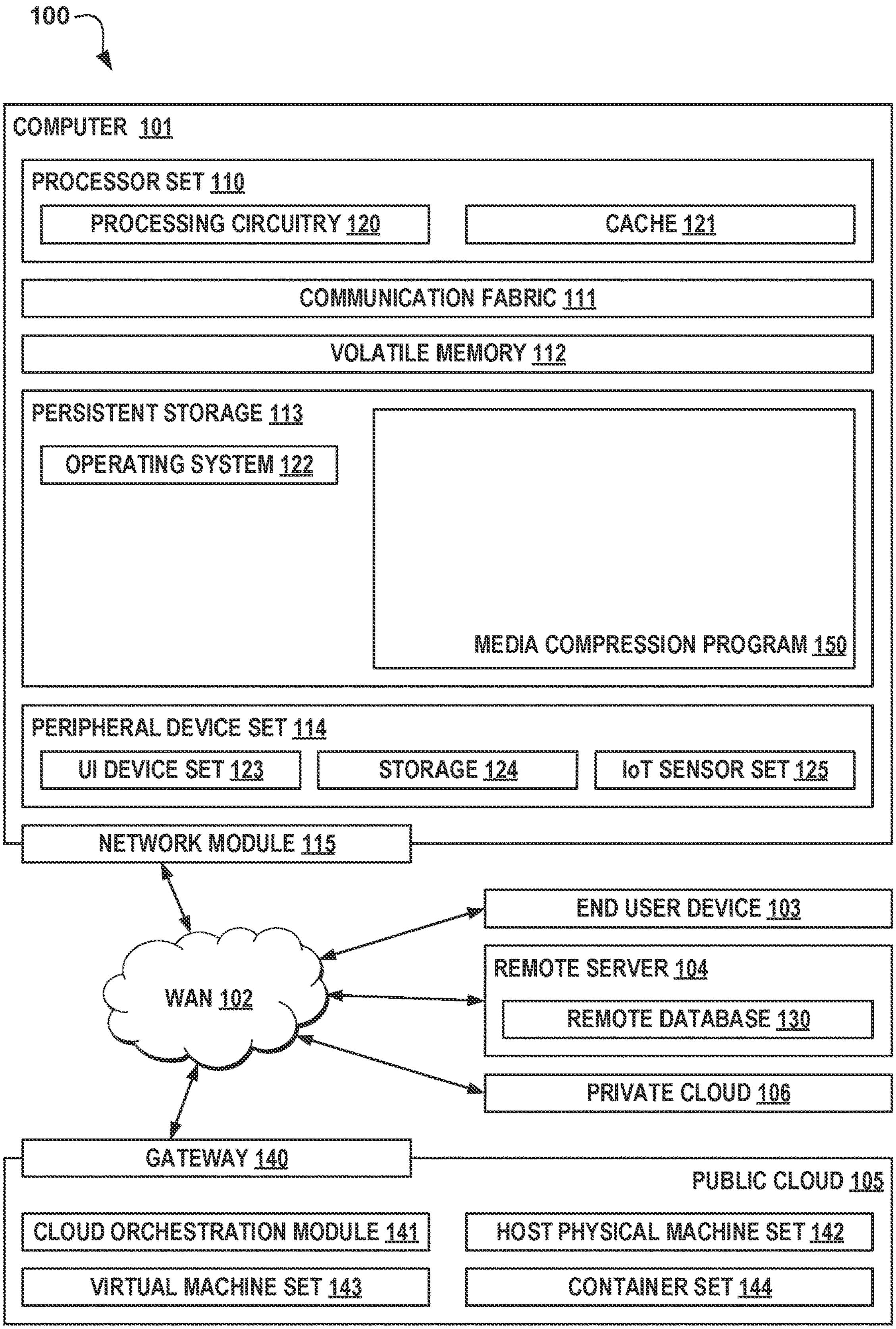

FIG. 1

AI GAN ENABLED MEDIA COMPRESSION FOR OPTIMIZED RESOURCE UTILIZATION

BACKGROUND

The present invention relates generally to the field of computing, and more particularly to a system for compressing media utilizing a generative adversarial network (GAN).

Video and images are key data types for artificial intelligence (AI) system analysis. Information may be extracted from the video and/or still images to create a knowledge corpus. The knowledge corpus may then be used as input for the AI system analysis. For example, in a fulfillment center, the videos and/or still images may be captured for process improvements and inspection purposes. An activity or process may have different types of individual steps and the individual steps may be performed with different types of tools. In analyzing the video and/or still images by the AI system, the size of the video and/or still images may be a factor to consider for effective AI system processing.

SUMMARY

According to one embodiment, a method, computer system, and computer program product for compressing media utilizing a generative adversarial network (GAN) is provided. The embodiment may include receiving one or more media assets and historical data from a knowledge corpus in accordance with an identified usage context. The embodiment may also include identifying, by a convolutional neural network (CNN), one or more objects in the one or more media assets. The embodiment may further include deriving a relevance score for each identified object based on the historical data and the identified usage context. The embodiment may also include creating a training data set for a GAN generator including one or more images of a first set of one or more objects that exceed a relevance score threshold. The embodiment may further include applying, by the GAN generator, one or more modifications to each object in the first set based on the relevance score of each object. The embodiment may also include in response to determining a GAN discriminator is able to identify each object in the first set modified by the GAN generator as real, generating, by the GAN generator, one or more updated media assets including a second set of one or more objects that are identified by the GAN discriminator as real.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 1 illustrates an exemplary computing environment according to at least one embodiment.

DETAILED DESCRIPTION

Figure 2:
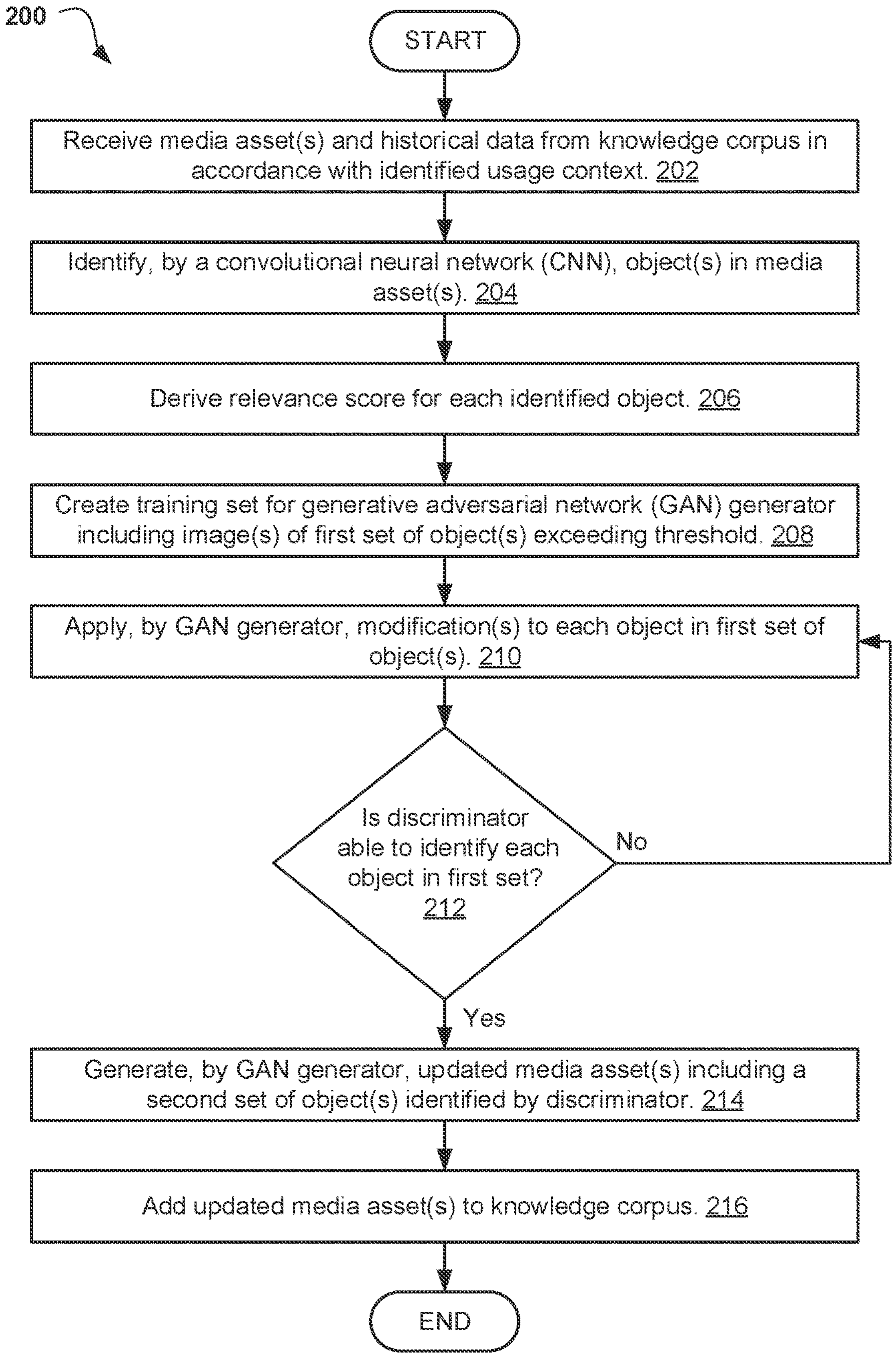
FIG. 2 illustrates an operational flowchart for compressing media utilizing a generative adversarial network (GAN) in a media compression process according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to a system for compressing media utilizing a generative adversarial network (GAN). The following described exemplary embodiments provide a system, method, and program product to, among other things, derive a relevance score for each identified object based on historical data and an identified usage context and, accordingly, apply, by a GAN generator, one or more modifications to each object in a first set of one or more objects based on the relevance score of each object. Therefore, the present embodiment has the capacity to improve artificial intelligence (AI) processing technology by reducing the data volume and resources required to process media.

As previously described, video and images are key data types for artificial intelligence (AI) system analysis. Information may be extracted from the video and/or still images to create a knowledge corpus. The knowledge corpus may then be used as input for the AI system analysis. For example, in a fulfillment center, the videos and/or still images may be captured for process improvements and inspection purposes. An activity or process may have different types of individual steps and the individual steps may be performed with different types of tools. In analyzing the video and/or still images by the AI system, the size of the video and/or still images may be a factor to consider for effective AI system processing. Videos and still images may contain extraneous information which is not required for AI system processing, thus increasing the data volume and resource consumption in processing the videos and still images. This problem is typically addressed by classifying different parts of videos and still images. However, simply classifying the different parts of videos and still images fails to reduce the overall file size.

It may therefore be imperative to have a system in place to determine what information in videos and still images is extraneous. Thus, embodiments of the present invention may provide advantages including, but not limited to, reducing the data volume and resources required to process media, determining the information in videos and still images that is extraneous, and reducing resource utilization costs. The present invention does not require that all advantages need to be incorporated into every embodiment of the invention.

According to at least one embodiment, when compressing various forms of digital media, one or more media assets and historical data from a knowledge corpus may be received in accordance with an identified usage context in order to identify, by a convolutional neural network (CNN), one or more objects in the one or more media assets. Upon identifying the one or more objects, a relevance score for each identified object may be derived based on the historical data and the identified usage context so that a training data set for a GAN generator including one or more images of a first set of one or more objects that exceed a relevance score threshold may be created. Then, one or more modifications to each object in the first set may be applied, by the GAN generator, based on the relevance score of each object such that it may be determined whether a discriminator of the GAN is able to identify each object in the first set modified by the GAN generator. According to at least one embodiment, in response to determining the GAN discriminator is able to identify each object in the first set modified by the GAN generator as real, one or more updated media assets including a second set of one or more objects that are identified by the GAN discriminator as real may be generated by the GAN generator.

According to at least one other embodiment, in response to determining the GAN discriminator is not able to identify each object in the first set modified by the GAN generator as real, an iterative process may be performed, until the GAN discriminator is able to identify each object in the first set as real, where one or more additional modifications to each object in the first set not identified as real may be applied, by the GAN generator, based on the relevance score of each object. In either embodiment, the updated one or more media assets may be added to the knowledge corpus.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following described exemplary embodiments provide a system, method, and program product to derive a relevance score for each identified object based on historical data and an identified usage context and, accordingly, apply, by a GAN generator, one or more modifications to each object in a first set of one or more objects based on the relevance score of each object.

Referring to FIG. 1, an exemplary computing environment 100 is depicted, according to at least one embodiment. Computing environment 100 contains an example of an environment for the execution of at least some of the computer code involved in performing the inventive methods, such as a media compression program 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory 112 may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage 113 allows writing of data, deletion of data and re-writing of data. Some familiar forms of persistent storage 113 include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

Peripheral device set 114 includes the set of peripheral devices of computer 101. Data communication connections between the peripheral devices 114 and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database), this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN 102 and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments the private cloud 106 may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the media compression program 150 may be a program capable of receiving one or more media assets and historical data from a knowledge corpus in accordance with an identified usage context, deriving a relevance score for each identified object based on historical data and an identified usage context, applying, by a GAN generator, one or more modifications to each object in a first set of one or more objects based on the relevance score of each object, reducing the data volume and resources required to process media, determining the information in videos and still images that is extraneous, and reducing resource utilization costs. Furthermore, notwithstanding depiction in computer 101, the electronic map engagement program 150 may be stored in and/or executed by, individually or in any combination, end user device 103, remote server 104, public cloud 105, and private cloud 106. The media compression method is explained in further detail below with respect to FIG. 2. It may be appreciated that the examples described below are not intended to be limiting, and that in embodiments of the present invention the parameters used in the examples may be different.

Figure 3:
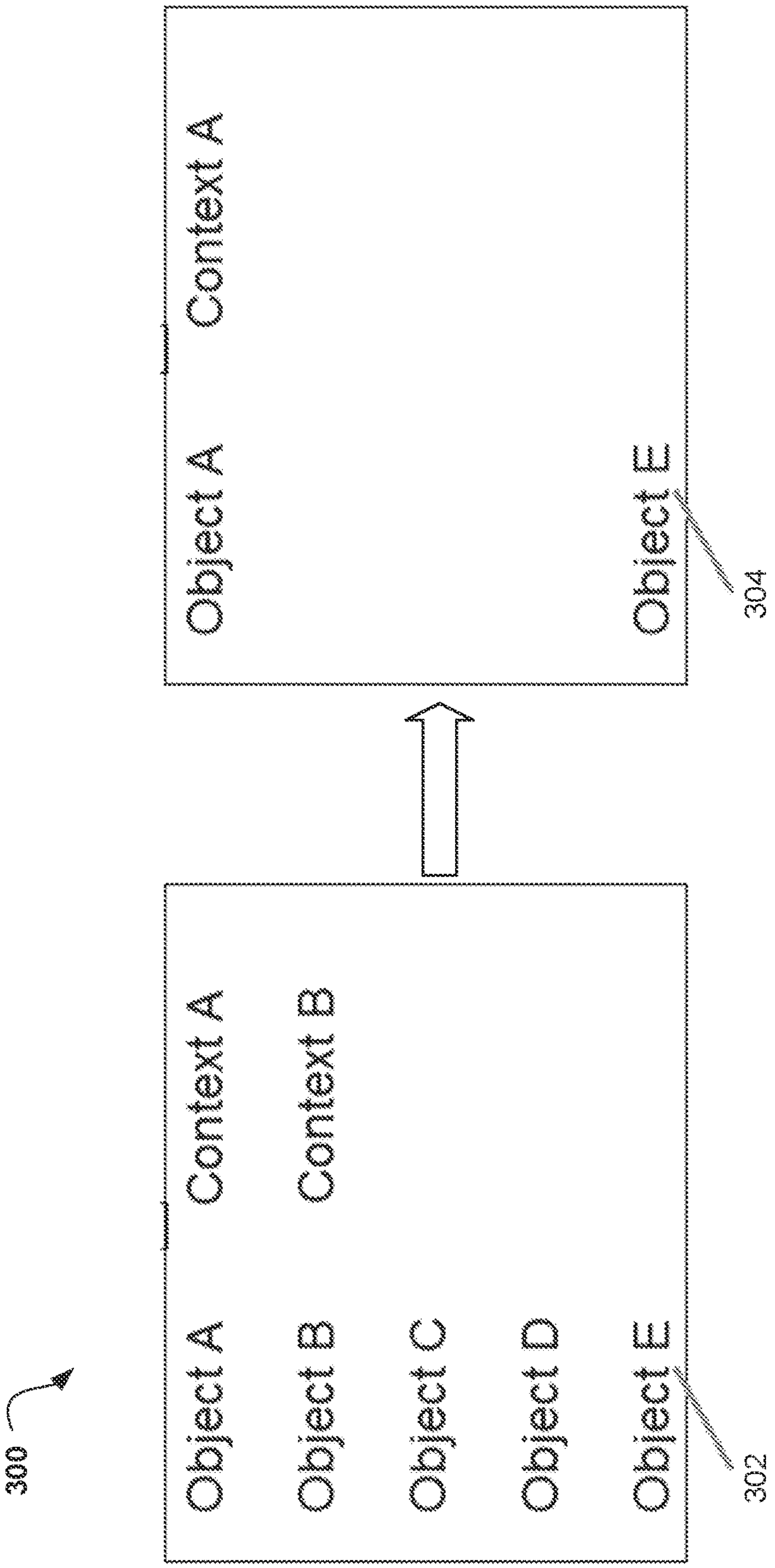
FIG. 3 is an exemplary diagram depicting a media asset before compression and after compression according to at least one embodiment.

Referring now to FIG. 2, an operational flowchart for compressing media utilizing a GAN in a media compression process 200 is depicted according to at least one embodiment. At 202, the media compression program 150 receives the one or more media assets and the historical data from the knowledge corpus in accordance with the identified usage context. Examples of the media asset may include, but are not limited to, still images and/or videos of an activity. Depending upon the usage context, the one or more media assets may be received. For example, where the usage context is packaging products in a fulfillment center, the media assets may include the still images and/or videos of the products being packaged. According to at least one embodiment, multiple usage contexts may be identified, as illustrated in FIG. 3.

The historical data may include, but is not limited to, minimum pixel density required for object recognition, video frames that were evaluated during previous activities, the importance of colors in objects to evaluate quality and effectiveness, and/or correlations between usage context and associated tools used during the activity. For example, where the usage context is packaging products in a fulfillment center, the packaging may be correlated with one or more devices in the fulfillment center that interact with the products. The historical data may be input into and retrieved from the knowledge corpus. In this manner, the media compression program 150 may learn from the historical data.

Then, at 204, the media compression program 150 identifies the one or more objects in the one or more media assets. The one or more objects are identified by the CNN. The one or more media assets relevant to the particular usage context may be evaluated by the CNN. For example, when packaging products in the fulfillment center, the identified objects may be Object "A," Object "B," Object "C," Object "D," and Object "E," as illustrated in FIG. 3. According to at least one embodiment, in addition to identifying the one or more objects, the CNN may also generate metadata relating to a location of the one or more objects, lighting conditions in the background of the one or more media assets, pixel density of the one or more objects, and/or color of the one or more objects.

For example, Object "A" may be an orange and blue object and may be displayed in the media asset with a pixel density of 95 pixels per inch (PPI). Continuing the example, Object "A" may be located on a conveyor belt with ample lighting in the background. In another example, Object "B"

may be a green and yellow object and may be displayed in the media asset with a pixel density of 100 pixels per inch (PPI). Continuing the example, Object “B” may be located in a delivery area with dim lighting in the background.

Next, at 206, the media compression program 150 derives the relevance score for each identified object. The relevance score is derived based on the historical data and the identified usage context. The relevance score may be a reflection of the importance of each object in evaluating the quality and effectiveness of the activity. In order to derive the relevance score, one or more machine learning algorithms may be used.

According to at least one embodiment, a Pearson correlation coefficient may generate a score describing the linear relationship between two variables. The Pearson correlation coefficient may be appropriate when one of the variables is time dependent and the other variable is image or object based. For example, when packaging products in the fulfillment center, the time dependent variable may be time and the object based variable may be current package position relative to the delivery area.

According to at least one other embodiment, Spearman’s rank correlation coefficient may generate a score of the linear relationship between two variables where one variable is ranked. For example, when packaging products in the fulfillment center, ranking may reflect the relative importance of product packaging to deliverability rate.

According to at least one further embodiment, cumulative density functions (CDF) may generate a score describing how often patterns are seen. For example, in an online package sorting system, CDF may reflect the frequency of a package being assigned to the delivery area in the fulfillment center.

According to at least one other embodiment, AdaBoost may generate a score indicating how well an algorithm will perform when making a prediction based on input from multiple models. For example, AdaBoost may be utilized to score the probability that an object will be assigned to a destination warehouse.

According to at least one embodiment, the relevance score of each identified object may be a numerical score (e.g., between 1 and 100). For example, where the identified usage context is packaging products in the fulfillment center, the identified objects may be a conveyor belt, the item to be shipped, nearby workers in the still image and/or video, and pictures on the walls of the fulfillment center. Continuing the example, the conveyor belt may be assigned a relevance score of 80, the item to be shipped may be assigned a relevance score of 90, the nearby workers may be assigned a relevance score of 30, and the pictures on the walls may be assigned a relevance score of 0. According to at least one other embodiment, the relevance score of each identified object may be a categorized level of relevance (e.g., no relevance, low relevance, moderate relevance, or high relevance). For example, where the identified usage context is packaging products in the fulfillment center, the identified objects may be a conveyor belt, the item to be shipped, nearby workers in the still image and/or video, and pictures on the walls of the fulfillment center. Continuing the example, the conveyor belt may be categorized as moderately relevant, the item to be shipped may be categorized as highly relevant, the nearby workers may be categorized as low relevance, and the pictures on the walls may be categorized as not relevant.

Then, at 208, the media compression program 150 creates the training data set for the GAN generator. The training data set includes the one or more images of the first set of one or more objects that exceed the relevance score threshold. It may be appreciated that in embodiments of the present invention, all objects in the first set exceed the relevance score threshold.

According to at least one embodiment, where the relevance score of each identified object is the numerical score, the relevance score threshold may also be a numerical value. For example, the conveyor belt may be assigned a relevance score of 80, the item to be shipped may be assigned a relevance score of 90, the nearby workers may be assigned a relevance score of 30, and the pictures on the walls may be assigned a relevance score of 0. Continuing the example, where the relevance score threshold is 50, the objects in the first set may be the conveyor belt and the item to be shipped, since the conveyor belt and the item to be shipped exceed the relevance score threshold.

According to at least one other embodiment, where the relevance score of each identified object is categorized level of relevance, the relevance score threshold may also be a categorical value. For example, the conveyor belt may be categorized as moderately relevant, the item to be shipped may be categorized as highly relevant, the nearby workers may be categorized as low relevance, and the pictures on the walls may be categorized as not relevant. Continuing the example, where the relevance score threshold is to include objects having a relevance score greater than low relevance, the objects in the first set may be the conveyor belt and the item to be shipped, since the conveyor belt and the item to be shipped exceed the relevance score threshold. In either of the embodiments described above, any object that does not exceed the relevance score threshold may be removed from the training data set. Once the training data set is created, the GAN generator may be trained by feeding the created training data set into the GAN generator. The GAN generator may then produce some output, described in further detail below with respect to step 210.

Next, at 210, the media compression program 150 applies the one or more modifications to each object in the first set. The one or more modifications are applied by the GAN generator based on the relevance score of each object. Applying the one or more modifications may include executing one or more compression techniques on each object in the first set. Examples of the compression technique may include, but are not limited to, blurring an image of an object, reducing pixel density and/or luminance of the object, removing color and/or shape of the object, changing saturation and hue of the object, reducing color palette of the object, and/or speeding up sequence rate of videos containing the object. For example, the conveyor belt may be categorized as moderately relevant, the item to be shipped may be categorized as highly relevant, the nearby workers may be categorized as low relevance, and the pictures on the walls may be categorized as not relevant. Continuing the example, since the conveyor belt is only moderately relevant, the media compression program 150 may change the color of the conveyor belt to black and white. In another example, since the item to be shipped is highly relevant, the media compression program 150 may change the saturation and hue of the item to be shipped without changing the color of the item to black and white.

According to at least one embodiment, a degree of compression applied to each object in the first set may be inversely proportional to the relevance score of each object in the first set. Thus, an object having a lover relevance score may be more compressed than an object having a higher relevance score. For example, where the compression technique includes blurring the image of the object, images of the nearby workers may be more blurred than images of the conveyor belt, since the conveyor belt is more relevant than the nearby workers. Additionally, images of the conveyor belt may be more blurred than images of the item to be shipped, since the item to be shipped is more relevant than the conveyor belt. For objects of no relevance, these objects may be blurred beyond recognition by any AI system. For example, the images of the pictures on the wall may be blurred beyond recognition.

According to at least one other embodiment, the pixel density of at least one object may be adapted consistent with the relevance score of the at least one object. As described above with respect to step 202, the historical data may include minimum pixel density required for object recognition. Continuing the example described above, the pixel density for the images of the pictures on the wall may be reduced beyond recognition. Additionally, for a highly relevant object, the pixel density may be adapted for different portions of the highly relevant object. For example, since the item to be shipped is a highly relevant object, the pixel density for the edges of the item to be shipped may be reduced, whereas the pixel density for the center of the item to be shipped may be increased. In this manner, pixel density for the most significant portions of the highly relevant object may be increased without increasing the image file size.

Then, at 212, the media compression program 150 determines whether the discriminator of the GAN is able to identify each object in the first set modified by the GAN generator as real. The output from the GAN generator (i.e., the one or more modifications to each object in the first set) is fed as input into the GAN discriminator. In any GAN, the goal of the GAN generator is to trick the GAN discriminator into classifying artificially generated (i.e., fake) images as real. In addition to feeding the output from the GAN generator into the GAN discriminator, the GAN discriminator is also fed unaltered images of each object in the first set. The GAN discriminator may then output a number between 0 and 1, where 0 indicates the GAN discriminator classified the object as fake and 1 indicates the GAN discriminator classified the image as real. For example, where the GAN discriminator receives a video frame containing a machine part that was compressed using one or more of the compression techniques described above with respect to step 210, the GAN discriminator may output a number classifying the machine part as real or fake.

In response to determining the GAN discriminator is able to identify each object in the first set modified by the GAN generator as real (step 212, "Yes" branch), the media compression process 200 proceeds to step 214 to generate the one or more updated media assets including the second set of one or more objects that are identified by the GAN discriminator as real. In response to determining the GAN discriminator is not able to identify each object in the first set modified by the GAN generator as real (step 212, "No" branch), the media compression process 200 reverts to step 210 to apply one or more additional modifications to each object in the first set based on the relevance score of each object.

It may be appreciated that in embodiments where the GAN discriminator is not able to identify each object in the first set as real, step 210 may be iterated until the GAN discriminator is able to identify each object in the first set as real. The GAN generator may apply one or more additional modifications to each object in the first set not identified as real based on the relevance score of each object. With each iteration, the GAN generator may improve the accuracy of generated images by adjusting the compression technique based on feedback from the GAN discriminator. For example, where the saturation and hue of the item to be shipped was changed during the original modification, the additional modification may involve the GAN generator gradually adjusting the saturation and hue of the item to be shipped until the GAN discriminator is able to identify the item to be shipped as real.

Next, at 214, the media compression program 150 generates the one or more updated media assets including the second set of the one or more objects that are identified by the GAN discriminator. The one or more updated media assets may be generated by the GAN generator. It may be appreciated that in embodiments of the present invention, all objects in the second set have been identified as real by the GAN discriminator. The trained GAN generator may be applied to all media assets in the knowledge corpus that are consistent with the identified usage context. For example, where the identified usage context is packaging products in a fulfillment center, all media assets relevant to packaging products may be fed into the GAN generator to generate the one or more updated media assets. For example, where the original media asset includes an unblurred (i.e., clear) image of the object, the one or more updated media assets may include different degrees of blurring for different objects in the second set based on the relevance score of each object, while still being recognizable to any AI system.

Then, at 216, the media compression program 150 adds the updated one or more media assets to the knowledge corpus. According to at least one embodiment, the updated one or more media assets may replace the original media assets in the knowledge corpus. According to at least one other embodiment, the updated one or more media assets may be added in addition to the original media assets in the knowledge corpus. In either embodiment, the updated one or more media assets may be utilized by any AI system during the evaluation of a process or activity.

Referring now to FIG. 3, an exemplary diagram 300 depicting a media asset before compression 302 and after compression 304 is shown according to at least one embodiment. In the diagram 300, the media asset before compression 302 may be the one or more media assets received in step 202, described above with respect to the description of FIG. 2. The CNN may identify the objects in the media asset before compression 302 as Object "A," Object "B," Object "C," Object "D," and Object "E." Additionally, the identified usage contexts in the media asset before compression 302 may include Context "A" and Content "B." The media asset after compression 304 may be the updated one or more media assets generated in step 214, described above with respect to the description of FIG. 2. In the diagram 300, since Object "B," Object "C," and Object "D" are non-relevant objects, and since Context "B" is a non-relevant context, Object "B," Object "C," Object "D," and Context "B" may be removed from the media asset after compression 304. Object "A" and Object "E" may be compressed with respect to their respective relevance scores, while remaining realistic enough to be recognizable to any AI system for evaluation.

It may be appreciated that FIGS. 2 and 3 provide only an illustration of one implementation and do not imply any limitations with regard to how different embodiments may be implemented. Many modifications to the depicted environments may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of compressing media utilizing a generative adversarial network (GAN), the method comprising:

receiving one or more media assets and historical data from a knowledge corpus in accordance with an identified usage context;

identifying, by a convolutional neural network (CNN), one or more objects in the one or more media assets;

deriving a relevance score for each identified object based on the historical data and the identified usage context, wherein the relevance score indicates a level of significance of each object in evaluating a quality of a task;

creating a training data set for a GAN generator including one or more images of a first set of one or more objects that exceed a relevance score threshold, wherein creating the training data set for the GAN generator further comprises training the GAN generator by feeding the created training data set into the GAN generator, wherein at least one object that does not exceed the relevance score threshold is removed from the created training data set;

applying, by the GAN generator, one or more modifications to each object in the first set based on the relevance score of each object;

determining whether a discriminator of the GAN is able to identify each object in the first set modified by the GAN generator; and in response to determining the GAN discriminator is able to identify each object in the first set modified by the GAN generator as real:

generating, by the GAN generator, one or more updated media assets including a second set of one or more objects that are identified by the GAN discriminator as real, wherein the trained GAN generator is applied to the one or more media assets in the knowledge corpus that are consistent with the usage context, and wherein the one or more updated media assets depict the second set of one or more objects at varying levels of compression based on the relevance score of each object in the second set of one or more objects.

2. The computer-based method of claim 1, further comprising:

in response to determining the GAN discriminator is not able to identify each object in the first set modified by the GAN generator as real, iterating, until the GAN discriminator is able to identify each object in the first set as real:

applying, by the GAN generator, one or more additional modifications to each object in the first set not identified as real based on the relevance score of each object.

3. The computer-based method of claim 2, further comprising:

adding the updated one or more media assets to the knowledge corpus.

4. The computer-based method of claim 1, wherein applying the one or more modifications further comprises:

executing one or more compression techniques on each object in the first set.

5. The computer-based method of claim 4, wherein a degree of compression applied to each object in the first set is inversely proportional to the relevance score of each object in the first set, wherein an object having a lower relevance score is more compressed than an object having a higher relevance score.

6. The computer-based method of claim 4, wherein at least one compression technique includes adapting a pixel density of at least one object in the first set consistent with the relevance score of the at least one object.

7. A computer system, the computer system comprising:

one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:

receiving one or more media assets and historical data from a knowledge corpus in accordance with an identified usage context;

identifying, by a convolutional neural network (CNN), one or more objects in the one or more media assets;

deriving a relevance score for each identified object based on the historical data and the identified usage context, wherein the relevance score indicates a level of significance of each object in evaluating a quality of a task;

creating a training data set for a generative adversarial network (GAN) generator including one or more images of a first set of one or more objects that exceed a relevance score threshold, wherein creating the training data set for the GAN generator further comprises training the GAN generator by feeding the created training data set into the GAN generator, wherein at least one object that does not exceed the relevance score threshold is removed from the created training data set;

applying, by the GAN generator, one or more modifications to each object in the first set based on the relevance score of each object;

determining whether a discriminator of the GAN is able to identify each object in the first set modified by the GAN generator; and in response to determining the GAN discriminator is able to identify each object in the first set modified by the GAN generator as real:

generating, by the GAN generator, one or more updated media assets including a second set of one or more objects that are identified by the GAN discriminator as real, wherein the trained GAN generator is applied to the one or more media assets in the knowledge corpus that are consistent with the usage context, and wherein the one or more updated media assets depict the second set of one or more objects at varying levels of compression based on the relevance score of each object in the second set of one or more objects.

8. The computer system of claim 7, the method further comprising:

in response to determining the GAN discriminator is not able to identify each object in the first set modified by the GAN generator as real, iterating, until the GAN discriminator is able to identify each object in the first set as real:

applying, by the GAN generator, one or more additional modifications to each object in the first set not identified as real based on the relevance score of each object.

9. The computer system of claim 8, the method further comprising:

adding the updated one or more media assets to the knowledge corpus.

10. The computer system of claim 7, wherein applying the one or more modifications further comprises:

executing one or more compression techniques on each object in the first set.

11. The computer system of claim 10, wherein a degree of compression applied to each object in the first set is inversely proportional to the relevance score of each object in the first set, wherein an object having a lower relevance score is more compressed than an object having a higher relevance score.

12. The computer system of claim 10, wherein at least one compression technique includes adapting a pixel density of at least one object in the first set consistent with the relevance score of the at least one object.

13. A computer program product, the computer program product comprising:

one or more computer-readable tangible storage medium and program instructions stored on at least one of the one or more computer-readable tangible storage medium, the program instructions executable by a processor capable of performing a method, the method comprising:

receiving one or more media assets and historical data from a knowledge corpus in accordance with an identified usage context;

identifying, by a convolutional neural network (CNN), one or more objects in the one or more media assets;

deriving a relevance score for each identified object based on the historical data and the identified usage context, wherein the relevance score indicates a level of significance of each object in evaluating a quality of a task;

creating a training data set for a generative adversarial network (GAN) generator including one or more images of a first set of one or more objects that exceed a relevance score threshold, wherein creating the training data set for the GAN generator further comprises training the GAN generator by feeding the created training data set into the GAN generator, wherein at least one object that does not exceed the relevance score threshold is removed from the created training data set;

applying, by the GAN generator, one or more modifications to each object in the first set based on the relevance score of each object;

determining whether a discriminator of the GAN is able to identify each object in the first set modified by the GAN generator; and in response to determining the GAN discriminator is able to identify each object in the first set modified by the GAN generator as real:

generating, by the GAN generator, one or more updated media assets including a second set of one or more objects that are identified by the GAN discriminator as real, wherein the trained GAN generator is applied to the one or more media assets in the knowledge corpus that are consistent with the usage context, and wherein the one or more updated media assets depict the second set of one or more objects at varying levels of compression based on the relevance score of each object in the second set of one or more objects.

14. The computer program product of claim 13, the method further comprising:

in response to determining the GAN discriminator is not able to identify each object in the first set modified by the GAN generator as real, iterating, until the GAN discriminator is able to identify each object in the first set as real:

applying, by the GAN generator, one or more additional modifications to each object in the first set not identified as real based on the relevance score of each object.

15. The computer program product of claim 14, the method further comprising:

adding the updated one or more media assets to the knowledge corpus.

16. The computer program product of claim 13, wherein applying the one or more modifications further comprises:

executing one or more compression techniques on each object in the first set.

17. The computer program product of claim 16, wherein a degree of compression applied to each object in the first set is inversely proportional to the relevance score of each object in the first set, wherein an object having a lower relevance score is more compressed than an object having a higher relevance score.

* * * * *